United States Patent
Kubota et al.

(10) Patent No.: US 9,374,223 B2
(45) Date of Patent: Jun. 21, 2016

(54) METHODS AND APPARATUS FOR INCLUDING A CONFIDENTIAL STRUCTURAL COMPONENT IN A THIRD PARTY REMOTE PRODUCT SIMULATION

(71) Applicant: Fujitsu Limited, Kanagawa (JP)

(72) Inventors: Tetsuyuki Kubota, Acton (GB); Peter Chow, Kent (GB); Serban Georgescu, London (GB); Makoto Sakairi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 249 days.

(21) Appl. No.: 14/291,134

(22) Filed: May 30, 2014

(65) Prior Publication Data

US 2015/0195091 A1     Jul. 9, 2015

(30) Foreign Application Priority Data

Jan. 6, 2014  (EP) .................................. 14150225

(51) Int. Cl.
| | |
|---|---|
| G06F 11/30 | (2006.01) |
| H04L 9/32 | (2006.01) |
| G06F 21/62 | (2013.01) |
| G06F 17/50 | (2006.01) |

(52) U.S. Cl.
CPC .......... *H04L 9/3234* (2013.01); *G06F 17/5018* (2013.01); *G06F 21/6227* (2013.01); *H04L 9/321* (2013.01); *G06F 2217/16* (2013.01)

(58) Field of Classification Search
CPC .. G06F 17/5018; G06F 17/20; G06F 21/6227
USPC ......................................................... 713/191
See application file for complete search history.

(56) References Cited

U.S. PATENT DOCUMENTS

| | | | | |
|---|---|---|---|---|
| 7,159,112 B1* | 1/2007 | Williams | ................ | G06F 21/84 380/54 |
| 7,203,310 B2* | 4/2007 | England | ................ | G06F 21/64 380/200 |
| 7,222,312 B2 | 5/2007 | Ferguson et al. | ................ | 716/3 |

(Continued)

FOREIGN PATENT DOCUMENTS

| | | |
|---|---|---|
| CN | 101621510 A | 1/2010 |
| CN | 102129489 A | 7/2011 |

OTHER PUBLICATIONS

"Welcome to the www.salome-platform.org", Dec. 31, 2010, http://web.archive.org/web/20101231081752.

(Continued)

*Primary Examiner* — Teshome Hailu
(74) *Attorney, Agent, or Firm* — Staas & Halsey LLP

(57) ABSTRACT

A method of allowing inclusion of a structural component which is the confidential property of an owner in a third party remote product simulation, the method comprising, in owner modelling software: importing a component model including geometry of the component, mesh data and at least one material property of the component; encrypting a secure part of the component model which is to remain confidential to the owner using a software key, and leaving an interface part of the component model unencrypted; adding a restriction to the component model before the component model is exported, the restriction specifying simulation result data which is not to be visible to the third party; and exporting the partially encrypted component model to the third party for use in third party modelling software.

14 Claims, 18 Drawing Sheets

(56) References Cited

U.S. PATENT DOCUMENTS

| | | | |
|---|---|---|---|
| 7,353,468 B2 | 4/2008 | Ferguson et al. | 716/4 |
| 7,698,664 B2 | 4/2010 | Ferguson et al. | 716/1 |
| 8,098,247 B2* | 1/2012 | Crucs | H03M 7/42 |
| | | | 341/50 |
| 8,302,039 B2 | 10/2012 | Ferguson et al. | 716/100 |
| 2004/0107087 A1 | 6/2004 | Fukui et al. | 703/26 |
| 2008/0052242 A1* | 2/2008 | Merritt | G06F 21/10 |
| | | | 705/59 |
| 2011/0071991 A1* | 3/2011 | Crucs | H03M 7/42 |
| | | | 707/693 |
| 2013/0305194 A1* | 11/2013 | Wang | G06F 17/5081 |
| | | | 716/52 |

OTHER PUBLICATIONS

Yan Wang et al., "Intellectual Property Protection in Collaborative Design through Lean Information Modeling and Sharing", Journal of Computing and Information Science in Engineering, vol. 6, No. 2, Jun. 2006, pp. 149-159.

Gerome Milau et al., "Controlling Access to Published Data Using Cryptography", Proceedings 2003 VLDB Conference, 2003 pp. 898-909.

* cited by examiner

- Finite element method (Quad-mesh)
  Node : point coordinates in space
  Element : Area surrounded by nodes.

Data structure
Node
(node number, x, y, z)
1  2.4, 5.3, 1.0
2  5.2, 5.3, 1.0
3  5.2, 8.0, 1.0
4  2.4, 8.0, 1.0
......

Element
(element number, node number, node number, node number, node number)
1   1  2  3  4
2   4  8  10  4
3   13  15  12  11
......

- Finite difference method the case of 2-dimension
  Grid represents the boundary between two area Data structure grid
x
1  0.0
2  1.2
3  3.4
4  5.6
......

Y
1  0.0
2  3.5
3  4.1
4  4.5
5  5.2
6  2.3
......

"B" owner apparatus

"A" third party apparatus

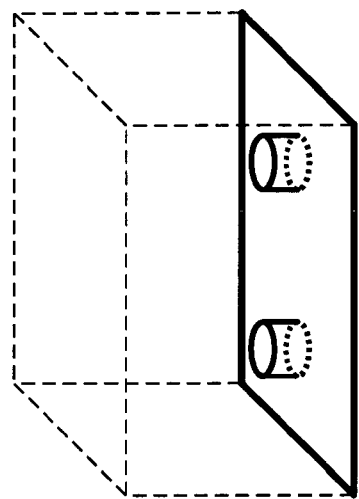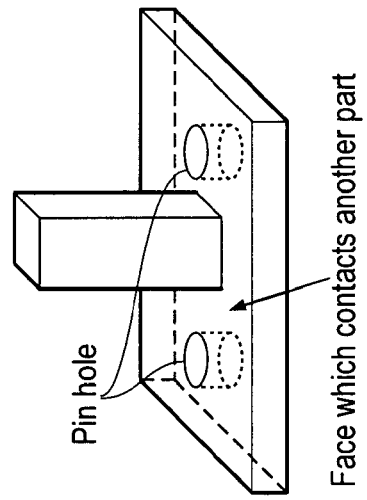
FIG. 9

Examples of heat sinks

Normal analysis model and analysis model using encrypted part model

Example of chip antennas

METHODS AND APPARATUS FOR INCLUDING A CONFIDENTIAL STRUCTURAL COMPONENT IN A THIRD PARTY REMOTE PRODUCT SIMULATION

CROSS-REFERENCE TO RELATED APPLICATIONS

This application claims the benefit of European Application No. 14150225.2, filed Jan. 6, 2014, the disclosure of which is incorporated herein by reference.

BACKGROUND

1. Field

The present invention relates to numerical simulation in multiple component products. Numerical simulation technologies exist, including structural analysis, which determines the effects of loads on physical structures and their components, computational fluid dynamics (CFD), which is used to analyze and solve problems involving fluid flow and potentially heat flow; and electromagnetic/magnetic field analysis which maps fields and their effects across components and structures for example to approximate surface currents and interior fields arising in complex electronic objects.

2. Description of the Related Art

These types of simulations are a subset of Computed Aided Engineering (CAE), which is the use of computer software for the purpose of modeling and simulating the behavior of products in order to improve their quality.

The invention particularly relates to the field of numerical simulations which involve models of products composed of separately sourced components. The models are usually three dimensional but may also be two dimensional. A typical application is CFD, structural or electromagnetic field simulation of any scale, from data centers to servers in mobile communication devices or LSI (large scale integration) circuits, in which the model usually consists of many components and in which an important property such as electromagnetic field density or temperature may be varied according to the component chosen and/or its placement.

Numerical simulation has become a crucial step in the design and manufacture of many industrial products and facilities. Results obtained from numerical simulations may be used to increase the quality and reliability of products by optimizing the components placed within the product, or on a larger scale, within a data centre or room within a data centre.

The flow of a traditional simulation process is as follows, using CFD as an example. First, a CAD model of the system to be simulated is created or obtained. Before the simulation can be performed, the model has to undergo pre-processing, in which a mesh of the model is created and then boundary conditions and material properties are set. In meshing, the geometry is partitioned (meshed) by a mesher into a very large number of elements, to form a mesh. The mesh, accompanied by the boundary conditions, is subsequently sent to a solver which uses standard numerical techniques, like the finite element method, or, more usually, the finite volume method to compute the effect (in this case fluid behavior and properties) of the boundary conditions on the system, using individual calculations for each element.

Other common numerical techniques are the finite difference method and the boundary element method. FIGS. 1a to 1c show different kind of mesh data for different numerical methods. FIG. 1a illustrates a node and element data structure for a tri-mesh finite element method; FIG. 1b shows the equivalent quad-mesh data structure; and FIG. 1c a 2-dimensional finite difference grid structure. The data structure contains position information about the mesh/grid elements/nodes/intersections. Each grid/mesh is constructed to suit the shape of the component being modeled. For complex geometries with many components, the meshing stage is particularly difficult both from a computational point of view and because in many instances it involves manual work.

After the pre-processing stage has been completed, the CFD solver mentioned above executes a simulation/modeling stage which solves the numerical equations, generally using an iterative technique to obtain the results of the simulation. The process ends with a post-processing stage, in which the results are visualized and analyzed.

Related art methods aim to address the computing and/or user input time required to simulate complex CFD models, in particular for models that are a combination of a number of components. These methods include using components, whose properties including their component geometry, modeling properties needed for simulation, and individual mesh are known and combining them in a desired configuration to make up a CFD model of a product. This allows the components to be meshed only once and then placed within a range of products, by simple selection and positioning of pre-meshed components.

It is desirable to make this use of pre-meshed components more widely available.

SUMMARY

Additional aspects and/or advantages will be set forth in part in the description which follows and, in part, will be apparent from the description, or may be learned by practice of the invention.

According to embodiments of a first aspect of the invention there is provided a method of allowing inclusion of a structural component which is the confidential property of an owner in a third party remote product simulation, the method comprising, in owner modeling software: importing a component model including geometry of the component, mesh data and at least one material property of the component; encrypting a secure part of the component model which is to remain confidential to the owner using a software key, and leaving an interface part of the component model unencrypted; adding a restriction to the component model before the component model is exported, the restriction specifying simulation result data which is not to be visible to the third party; and exporting the partially encrypted component model to the third party for use in third party modeling software.

The inventors have realized that there may be some barriers in using pre-meshed component models in a commercial situation in which a proprietary component is to be inserted into a third party product and the proprietary component still has at least some confidential characteristics. For example, a heat sink may be owned by a manufacture company who does not wish to disclose the material and/or shape of the heat sink until just before release. However customers of the heat sink design and manufacturer will wish to check the cooling effects of new products incorporating the heat sink as soon as possible. A similar example is in antenna design.

Invention embodiments allow cooperation between the owner of the component and a third party organization in that the owner can provide a pre-meshed model to the third party, which model is however encrypted to retain confidential information and restricted (concealed) to allow simulation data to remain invisible to the third party.

For example, the restricted simulation data may be all the data related to the simulation in the volume occupied by the component or that detailed data which might reveal the shape or material of the component to be derived. Other data, such as more general data (e.g. a temperature) and/or data outside of the proprietary component in the model may be visible to the third party. A default restriction of all the data may be applied, unless the owner chooses another restriction option.

Thus this aspect of the invention, which relates to a method in an owner organization, relates to importation of the component model (that is its introduction into the software or the part of the software that carries out the method steps). The component model includes at least the geometry of the component, mesh data (for example in the form of a grid or a node/element structure) and at least one material property of the component that is relevant for modeling. The component model is not completely encrypted, rather a secure part thereof which is to remain confidential is encrypted and an interface part for incorporation of the model within the product model is unencrypted.

A restriction is added to the component model either before or after encryption or in parallel with the encryption, the restriction specifying simulation result data which is not to be visible to the third party. Finally the partially encrypted component model including the restriction is exported to the third party, for example on disc or over the internet.

According to embodiments of a second aspect which relates to method steps in the third party organization, there is provided a method of including a structural component which is the confidential property of an owner in a third party product simulation, the method comprising (in the third party modeling software): importing a partially encrypted component model including geometry of the component, mesh data, at least one material property of the component, and a restriction specifying simulation result data which is not to be visible to the third party, wherein the partially encrypted component model includes a secure part encrypted using a software key, and an unencrypted interface part; inserting the component model within the product model using the unencrypted interface part of the component mode; decrypting the secure part of the partially encrypted component model; executing the simulation; and applying the restriction.

In the third party modeling software, the partially encrypted model is imported and then inserted using the unencrypted interface part within the product model. Then the secure part of the partially encrypted component model is decrypted. Alternatively, the component model may be decrypted before insertion. Decryption within the modeling software in the third party which corresponds to the owner modeling software allows the information to stay confidential within the software itself and not be released to the third party. After the simulation is executed, (or before or during execution) the restriction is applied, for example so that results which could allow unwanted disclosure of properties of the component remain confidential.

One important benefit of invention embodiments is that it is possible to carry out simulation and enhance cooperation between two organizations even if a component includes confidential information and there would otherwise be reluctance to provide it to a third party for a simulation, which is however required often at a fairly early stage of design of a new product.

Confidentiality is maintained in that not only can a desired part of the component model be encrypted but a restriction can be added to specify simulation result data which is not to be visible to the third party.

Any suitable design and or manufacturing steps may be taken after simulation and as a consequence of the simulation results. For example, a different component may be used and/or the component position allowed, so that the final product is altered.

The methods in both the owner and third party organizations may be related to a physical property-based 3-dimensional numerical simulation. Examples of such simulations include computational fluid dynamic simulations, structural analysis and field analysis simulations, such as electromagnetic field analysis. Any or all of these simulations are useful in assessing what structural component should be included in a product and in what position. The term structural as used herein is simply intended to include 3-dimensional physical elements, and does not relate to any particular load-bearing function.

In preferred embodiments, an interface part of the component model is unencrypted. This interface part may include geometry data, for example related to the physical relationship of the component model to one or more other components of the product, which may be useful for positioning of the component model. The interface part may be user defined in dependence upon the circumstances of inclusion of the component within the third party product, for example to provide features of one face of the component fully or partially. Alternatively or additionally, the interface part may include geometry data related to positioning features of the component specifically provided for locating the component within an overall product.

The component model includes geometry of the component (for example in the form of CAD data), mesh data (for example in the form of data in a node and element data structure or in the form of a grid data structure) and at least one material property of the component (for example heat capacity, electrical conductivity, mass density, thermal conductivity etc). Preferably, the component model also includes simulation parameters, such as any of the boundary condition, a time step and a contact condition (e.g., thermal resistance between two parts which are in contact with each other). Boundary conditions may include intake and exit conditions, pressure conditions, symmetry conditions, physical boundary conditions etc, all related to the mesh or grid used.

A software key is used for the encryption and this is preferably specific to the modeling software and not known to the third party. This reserves the confidential data within the software itself. For enhanced security, the software key may be also not known to the owner. This can allow the same methodology key to be used for transfer of components for modeling in both directions.

For improved security, an additional key may be used. In one embodiment, the secure part is encrypted using both the software key and a user key, wherein the user key is preferably a public key belonging to the third party, for use in decryption with a corresponding private key. This known public/private key functionality adds a further layer of security.

The restricted simulation result data may be any data which if revealed to the third party could allow derivation of confidential component properties. Thus the restriction may apply to detailed data and the detailed data be used to give an overall (and non-restricted) outcome which is sufficient for simulation but does not reveal for example the construction of the component. Additionally or alternatively, the results of the simulation may be restricted so that results directly in, on or around the component are not visible whereas results in the rest of the model can be freely viewed. The skilled reader will appreciate that the restricted results may be completely deleted or may be encrypted rather than deleted. The encryption can be of advantage, if for example the results may be used to restart a simulation after an interruption and deletion would otherwise have led to the complete simulation being carried out again.

The restriction or deletion step can take place after execution of the simulation or during execution of the simulation, depending on the circumstances.

Preferably, a graphical user interface (GUI) displays the simulation results except the restricted simulation results.

Some extra measures may be taken to allow positioning of the component model within the product model. In one preferred embodiment, the third party modeling software detects a collision between the component model and one or more other parts of the product model based on the interface part, and highlights the collision to a user via a GUI. This can allow the user to manually position the component model.

To help the user, the GUI may have additional functionality indicating where the component model may be placed. For example, the third party modeling software and GUI may create and display a boundary box of the component model. The boundary box may be created after the secure part of the partially encrypted component model has been decrypted, for example by using the maximum length in the three perpendicular axes or dimensions of the component to produce a cuboid. This functionality may be in addition to the interface part. When the component is inserted into the product, the nearest face of the boundary box to a collision with another part of the product model may be highlighted.

Preferably, the area in which the component model can be included in the product model without collision is shown in a GUI, for example using the above boundary box methodology and/or by marking the edges of the area (or areas) in the GUI.

Embodiments of invention also extend to the apparatus equivalent of the method in the owner organization and in the third party organization. The apparatus at the owner or the third party organization or both may include functionality to carry out both the encryption method and the decryption and simulation method, so that it can also carry out the other role (owner/third party) for example for a different component and product combination. However, the apparatus functionality is described separately by role below, for simplicity.

Thus in an embodiment of a further aspect related to the owner role, there is provided an apparatus arranged to allow inclusion of a structural component which is the confidential property of an owner in a third party remote product simulation, the apparatus comprising: an importer operable to import a component model including geometry of the component, mesh data and at least one material property of the component; an encrypter operable to encrypt a secure part of the component model which is to remain confidential to the owner using a software key, and to leave an interface part of the component model unencrypted; a restricter operable to add a restriction to the component model, the restriction specifying simulation result data which is not to be visible to the third party; and an exporter operable to export the partially encrypted component model to the third party for use in third party modeling software.

In an embodiment of a final aspect related to the third party organization, there is provided an apparatus arranged to include a structural component which is the confidential property of an owner in a third party product simulation, the apparatus comprising: an importer operable to import a partially encrypted component model including geometry of the component, mesh data, at least one material property of the component, and a restriction specifying simulation result data which is not to be visible to the third party, wherein the partially encrypted component model includes a secure part encrypted using a software key, and an unencrypted interface part; an insertion tool operable to insert the component model within the product model using the unencrypted interface part of the component mode; a decrypter operable to decrypt the secure part of the partially encrypted component model; and a simulator operable to execute the simulation and apply the restriction.

The invention also provides a computer program or a computer program product for carrying out any of the methods described herein, and a computer readable medium having stored thereon a program for carrying out any of the methods described herein.

The reader will appreciate that the invention can be implemented in digital electronic circuitry, or in computer hardware, firmware, software, or in combinations of them. The invention can be implemented as a computer program or computer program product, i.e., a computer program tangibly embodied in an information carrier, e.g., in a machine-readable storage device or in a propagated signal, for execution by, or to control the operation of, one or more hardware modules. A computer program can be in the form of a stand-alone program, a computer program portion or more than one computer program and can be written in any form of programming language, including compiled or interpreted languages, and it can be deployed in any form, including as a stand-alone program or as a module, component, subroutine, or other unit suitable for use in a data processing environment. A computer program can be deployed to be executed on one module or on multiple modules at one site or distributed across multiple sites, for example of the owner organization and at the third party organization, interconnected by a communication network.

Method steps of the invention can be performed by one or more programmable processors executing a computer program to perform functions of the invention by operating on input data and generating output. Apparatus of the invention can be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

Test scripts and script objects can be created in a variety of computer languages. Representing test scripts and script objects in a platform independent language, e.g., Extensible Markup Language (XML), allows one to provide test scripts that can be used on different types of computer platforms.

The invention is described in terms of particular embodiments. Other embodiments are within the scope of the following claims. For example, the steps of the invention can be performed in a different order and still achieve desirable results. Thus in one embodiment the restriction at the owner side may be added before the component model is imported into the relevant part of the modeling software, or take place after importation but before encryption. Equally, in the third party, decryption can take place before insertion of the component and the restriction can be applied at any suitable time.

An apparatus according to preferred embodiments of the present invention can comprise any combination of the method aspects and vice versa. Methods according to the method embodiments can be described as computer-implemented in that they require processing and memory capability.

The apparatus according to preferred embodiments is described as operable to (configured or arranged to) carry out certain functions. This configuration or arrangement could be by use of hardware or middleware or any other suitable system. In preferred embodiments, the configuration or arrangement is by software. In general the hardware mentioned may comprise the elements listed as being to provide the functions defined. Elements of the invention have been described using functional terms such as "importer" and "encrypter". The skilled person will appreciate that such terms and their equivalents may refer to parts of the hardware system that are spatially separate but combine to serve the function defined. Equally, the same physical parts of the hardware may provide two or more of the functions defined. For example, separately defined elements may be implemented using the same memory and/or processor as appropriate.

BRIEF DESCRIPTION OF THE DRAWINGS

These and/or other aspects and advantages will become apparent and more readily appreciated from the following description of the embodiments, taken in conjunction with the accompanying drawings of which:

FIG. 9 is an example of the encryption of geometry;

DETAILED DESCRIPTION

Figure 1A:
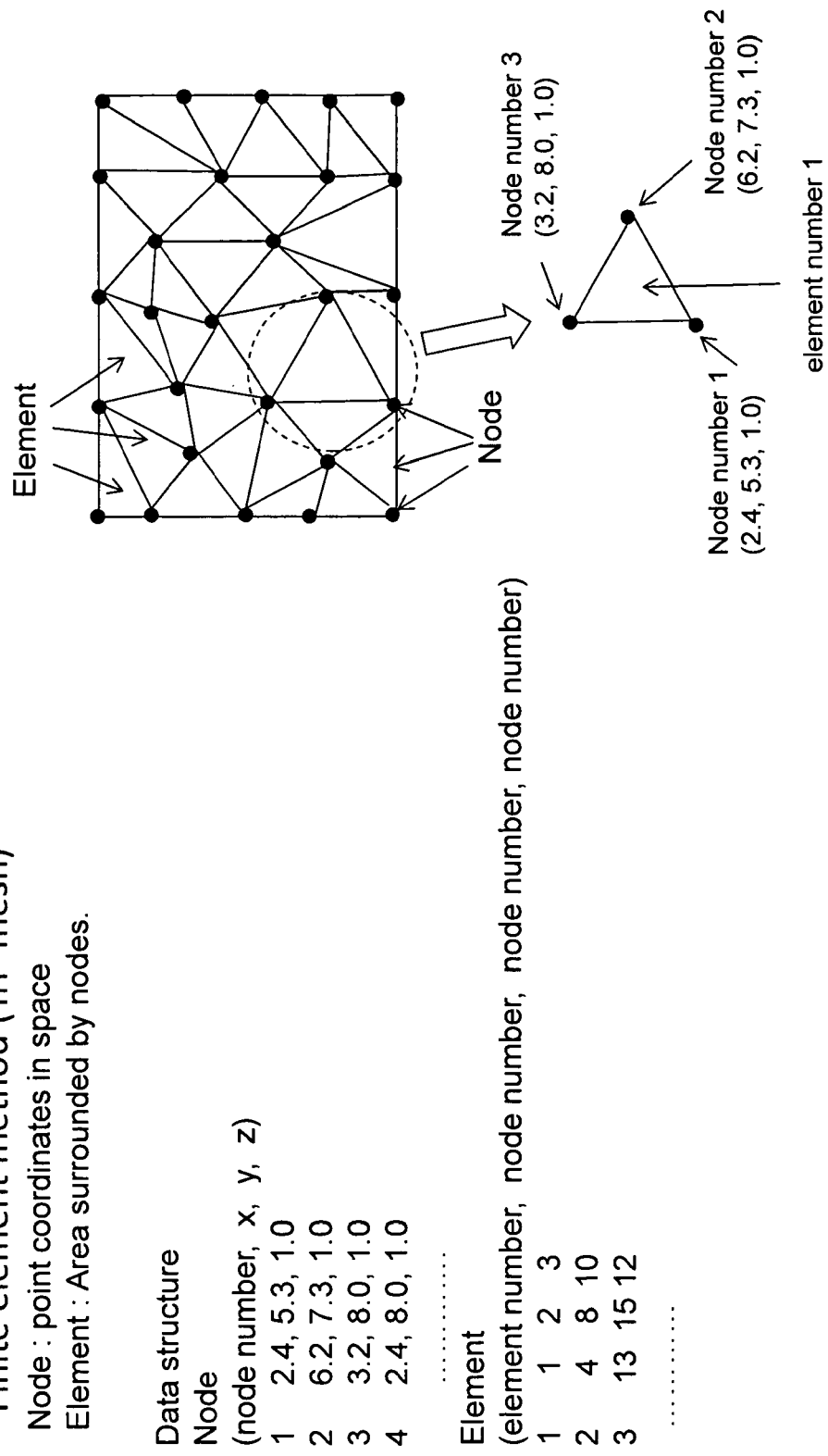
FIG. 1a shows mesh data for a tri-mesh used in a finite element method.
Figure 1B:
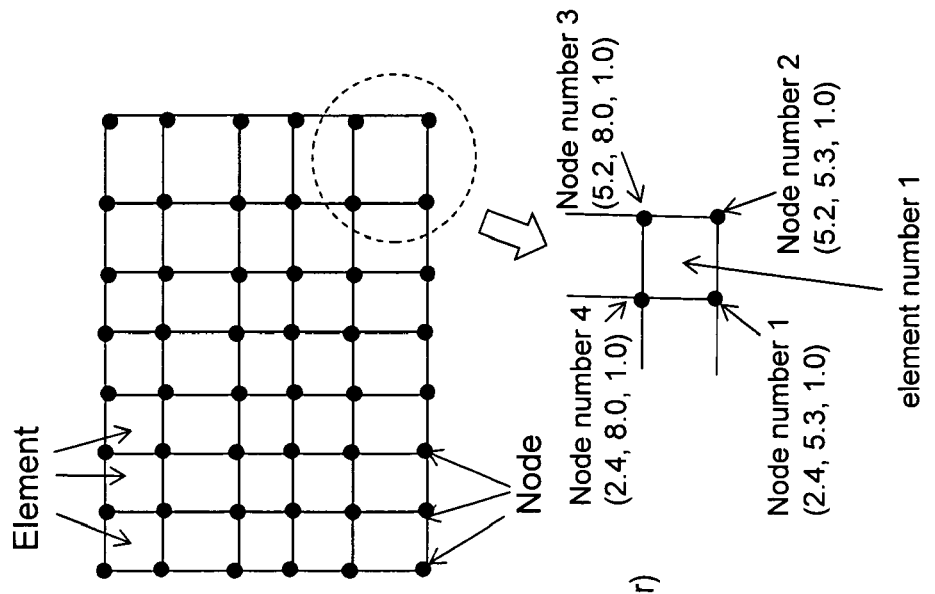
FIG. 1b shows mesh data for a quad mesh used in a finite element method.
Figure 1C:
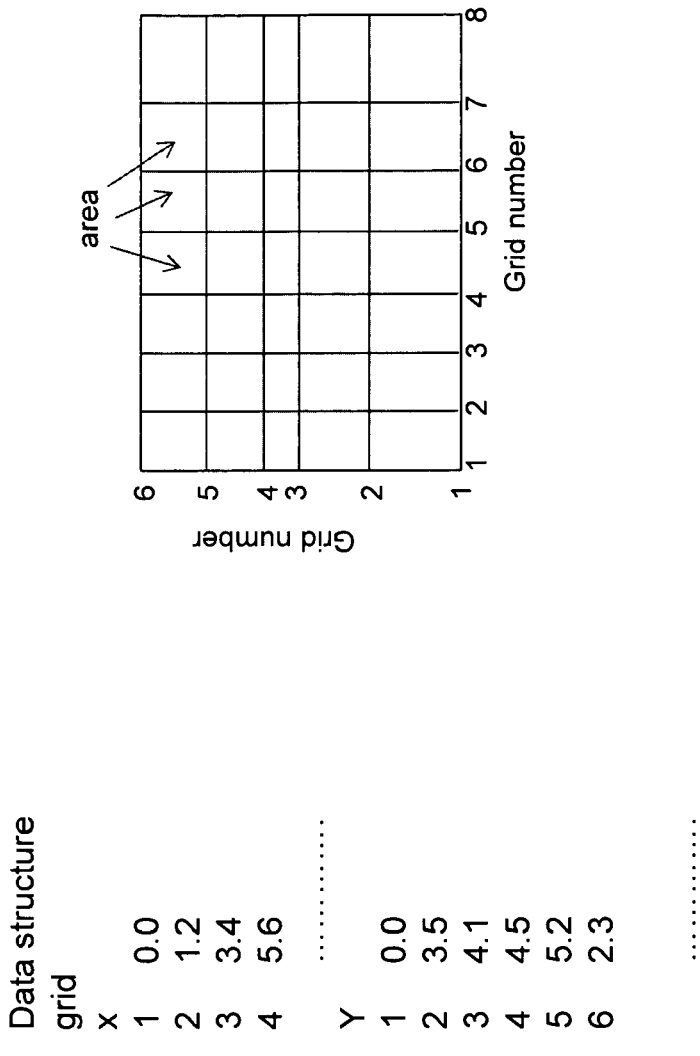
FIG. 1c shows mesh data in a 2D finite difference method.

Reference will now be made in detail to the embodiments, examples of which are illustrated in the accompanying drawings, wherein like reference numerals refer to the like elements throughout. The embodiments are described below to explain the present invention by referring to the figures.

Figure 2:
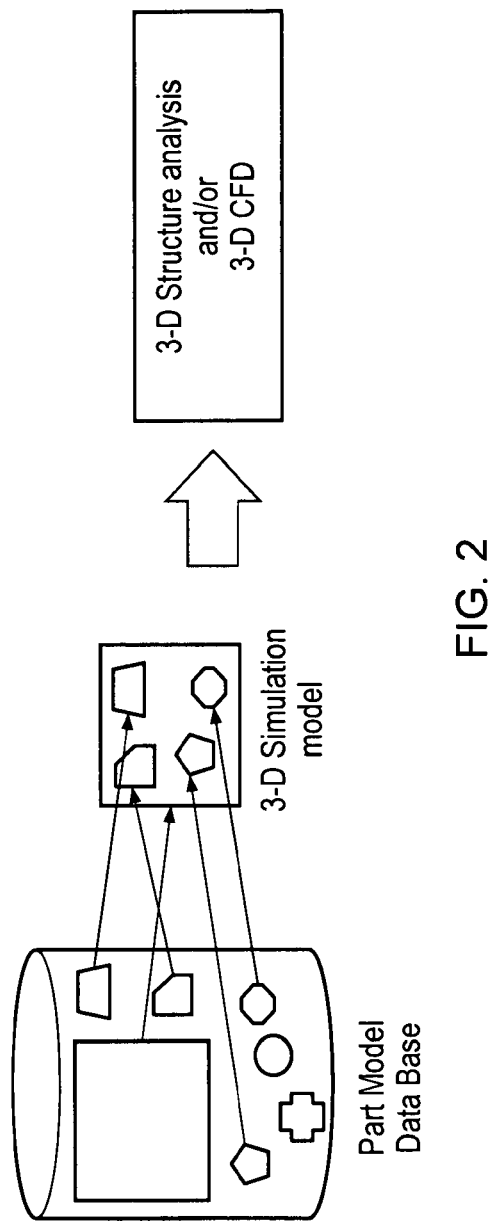
FIG. 2 shows the creation of an analysis model.

FIG. 2 shows the idea of using a model of database parts for inclusion in a 3-dimensional simulation model used, in this case, for 3D structural analysis or 3D CFD. In this illustration, individual components (or parts) are stored both separately, and grouped together to form a product.

Recently, 3-dimensional (3-D) numerical simulation technologies (such as structural, or field analysis or computational fluid dynamics (CFD)) have become widely used in product development. When a 3-D simulation model is prepared, the part (or component) models can be re-used, as explained previously. The 3-D simulation model may contain all the data used to perform analysis (e.g. mesh data, material properties, boundary conditions setting parameters for software, which may involve another party's confidential materials) for all the parts in a given product. Each part model thus includes the same types of data (geometrical data, mesh data, material property, and parameters for simulation etc). An operator chooses parts from one or more databases, and a 3-D simulation model is created to assemble them.

Subsequently, simulation software creates numerical data (e.g. matrix and vector data) using this 3-D simulation data and numerical simulation is performed. When the numerical simulation finishes, the operator can obtains the result of structural analysis, field analysis and/or CFD as shown in FIG. 2.

The inventors hypothesize that with a free transfer of information, when an operator, who belongs to an organization that is called "Party A" (a third party), wants to use some part model which belongs to another organization that is called "Party B" (the owner), this operator requests Party B to send the part model. But in many cases, the part model includes confidential information (e.g. shape of part, material property etc), therefore Party B cannot send this part model to another party. Then Party A's operator cannot obtain Party B's part model and cannot execute a 3-D simulation including the component.

Invention embodiments propose the so-called "Encrypted part model" approach, which is 3-D simulation software that has encrypted and non-encrypted functionality for use at the third party and owner organizations. This software package can encrypt and decrypt part models, as explained in more detailed hereinafter. Additionally, an encrypted part model may be decrypted only by this software. When the part model is encrypted by this software, Party B (the owner) can send the encrypted part model to Party A with confidentiality maintained.

Figure 3:
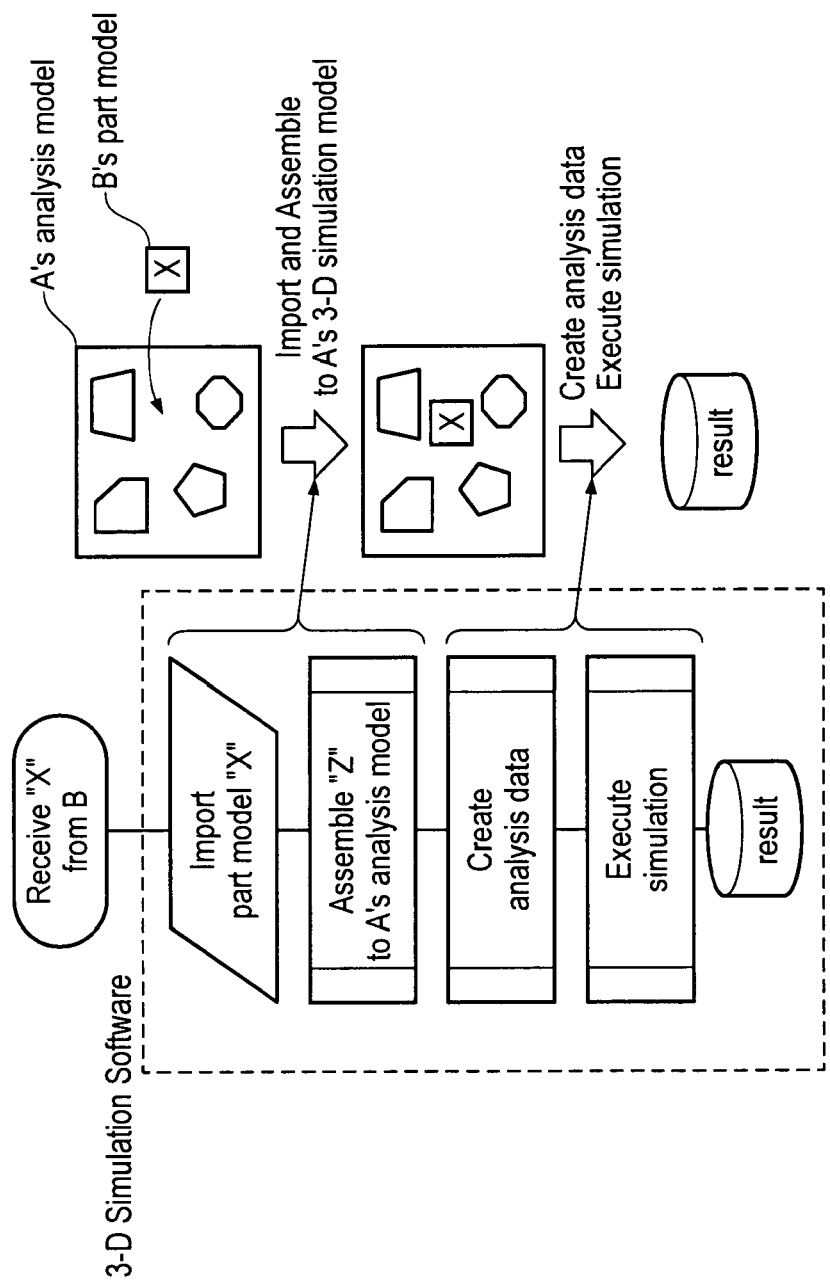
FIG. 3 is a flow chart of a method of creating a 3D simulation using a component from another party.

FIG. 3 shows the scenario without encryption. When a 3-D simulation model is created to perform structural or field analysis and/or CFD, some part models are assembled. These part models are obtained from not only the simulator's own organization but also from another organizations. FIG. 3 shows a flow chart method to create a 3-D simulation model. Party A (third party) wants to insert Party B's part model, which proprietary model is called X, into Party A's 3-D simulation model (as shown in the right hand graphic). First, Party A requests Party B to send part model X. If Party A obtains X from Party B, Party A can input X to software and create a 3-D simulation model completely, which includes X. After that, the 3-D simulation software creates analysis data and performs numerical simulation.

In FIG. 3, if X includes some confidential data belonging to owner B and B thus cannot disclose X, A cannot create a simulation model completely. However, if A cannot know the contents of X and yet can still perform numerical simulation, then B can give X to A for use in simulation.

Invention embodiments allow this distribution of a part model between individual organizations with confidentiality maintained. The main application is 3-dimensional simulation software which is used in the development of manufacturing products.

Figure 4:
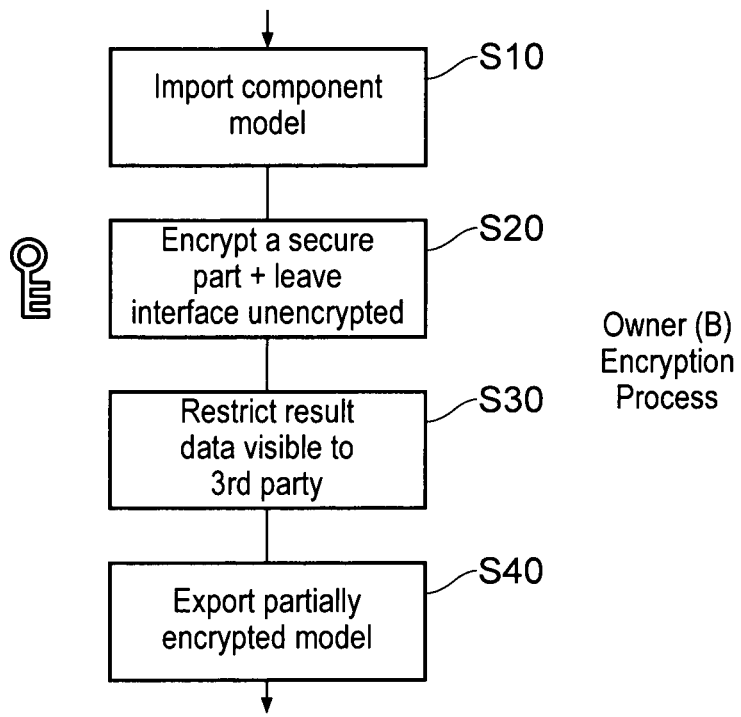
FIG. 4 is a flow chart showing a general embodiment of a method in the owner software.
Figure 5:
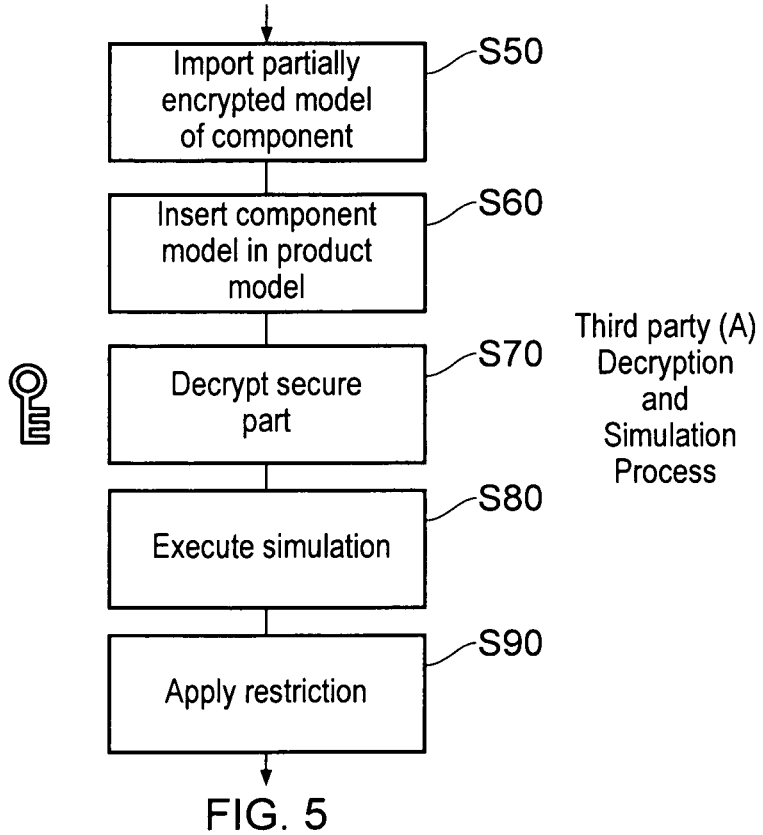
FIG. 5 is a flow chart showing a general embodiment of a method in the third party software.

Invention embodiments use the general methodology as shown in FIGS. 4 and 5. FIG. 4 shows a process in an owner organisation. In step S10 a component model is imported, for example into the modelling software, or into the relevant part of the modelling software. In step S20 a secure part of the component is encrypted, for instance to safeguard a confidential shape, material or other property of the model and an interface part of the model is left unencrypted. In step S30 the results of a simulation performed on the component model are restricted so that some information is not visible to any third party carrying out such a simulation. In step S40 the partially encrypted model (including the secure part, the interface part and the restriction) is exported. Thus there are two elements of security: firstly encryption preferably using a software key and secondly restriction of results of simulation.

FIG. 5 shows the corresponding decryption method and simulation in a third party company. In step S50 the partially encrypted model of the component is imported into the software. In step S60 the component model is inserted into a product model. In step S70 the secure part of the component is decrypted and in step S80 the simulation is executed. In step S90 the restriction is applied. Thus the result of the simulation includes the component within the model but still protects proprietary information belonging to the owner of the component.

Of course the third party product simulation may include more than one encrypted model component as necessary for design of the product concerned. The key shown in FIGS. 4 and 5 is a software key which belongs to the modelling software installed at the owner and at the third party. In a different scenario, the roles of these two organisations may be reversed. Thus the same organisation can take both roles, but not for the same simulation.

Figure 6:
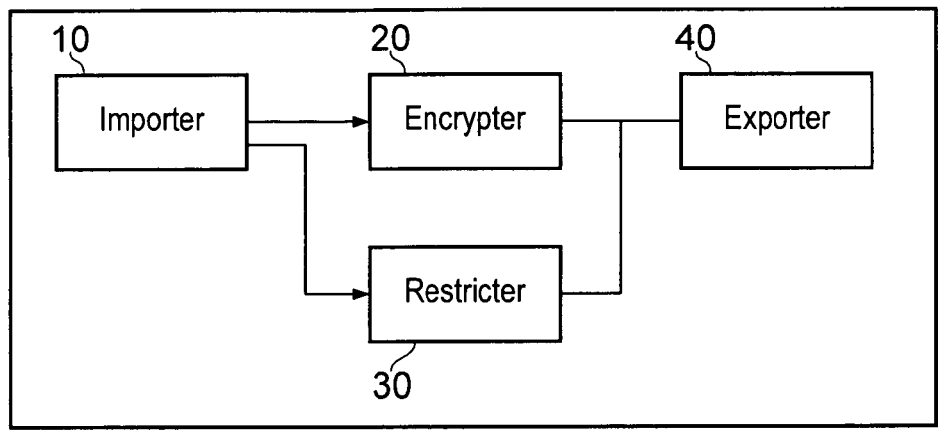
FIG. 6 is a schematic representation showing a general embodiment of the owner apparatus.
Figure 7:
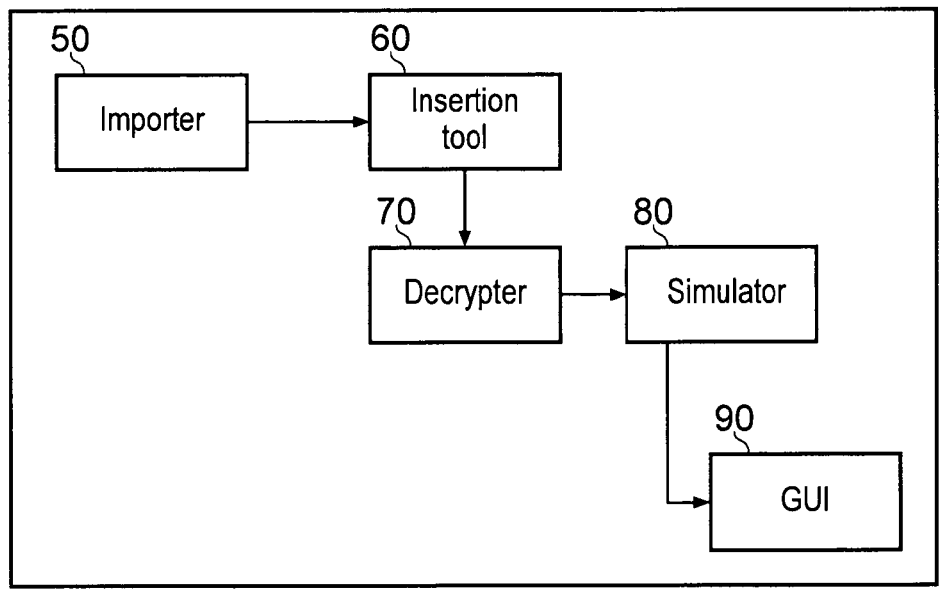
FIG. 7 is a schematic representation showing a general embodiment of the third party apparatus.

FIG. 6 shows the structure of an apparatus in the owner organisation. The structure is shown in terms of functional blocks within an apparatus which is embodied as a computer. Importer 10 imports the component model; encrypter 20 encrypts the secure part but not the interface part of the component model. Restricter 30 adds a restriction to the simulation result data visible to the third party and exporter 40 exports the partially encrypted component model including the restriction. Similarly, FIG. 7 shows the third party apparatus with a corresponding decryption and a modelling functionality. The importer imports the partially encrypted component model including the restriction. Insertion tool 60 inserts the component model within the product model with help from the interface part for positioning. Decrypter 70 decrypts the secure part within the software only in order to run the simulation. Simulator 80 is able to execute the simulation and apply the restriction. Finally GUI 90 may be used for showing the results of the simulation, as well as for input by the operator.

Invention embodiments make it possible to distribute a part model with confidentiality maintained. A party can create 3-D simulation model using another party's component without getting to know the confidential information which is included in the component.

The strategy used is that 3-D simulation software (for example for structural analysis, EMF field analysis or CFD) has encrypted and un-encrypted functionalities. Also, some information about a part model (such as a geometrical shape) can be guessed from a result of 3-D simulation. Therefore, it is necessary to conceal some results. The 3-D simulation software of invention embodiments can have the following features.

1. The 3-D simulation model is made by assembling components in the software. The 3-D simulation software, which executes structure and/or field analysis and/or CFD, can include functionalities to encrypt a part model and to decrypt it.
2. This software (at the owner and at the third party sites) has its own key which is used to encrypt and decrypt part model. Therefore, only this software can decrypt a part model which is encrypted by this software.
3. In addition to the software's own key, another key which is defined by a user can be used to encrypt the part model. If a user wishes to use such a key, it is possible to use a public key cryptosystem.
4. The full information made by decrypting the part model is not outputted to a file and/or a monitor and is used only inside this software. Therefore, a user cannot see the information of an encrypted part model.
5. When a user places an encrypted model in a 3-D simulation model, the user needs information as to where it should be placed in the 3-D simulation model. Therefore, the person who creates the encrypted part model can select some geometries to clarify the relation between other parts (e.g. a face which is glued another part, screw holes, pins etc.). Some selected geometries are thus unencrypted and recognized (seen) in the 3-D simulation software.
6. When an encrypted part model is assembled into a 3-D simulation model, a user cannot notice its (full) geometry. Because of this, the user cannot check whether the position of actual 3-D geometry, which is included in the encrypted part model, is suitable. Especially, it is necessary to check the relation between geometries, for example collision between parts, rather than connection to other solid connection or contact to other parts is allowed, but not collision, which would effectively represent overlap of two solid parts. Therefore, this 3-D simulation software has functionality to check the relation between geometries (FIG. 8).
7. Some results which are obtained from the simulation are deleted automatically. The data type (e.g. temperature, flux velocity, stress, etc) which must be deleted can be specified in the part model by user. The deleted region may be the area of encrypted model area. Alternatively, encryption may be used rather than deletion, for example so that files can be restarted in transient simulation.

Possible benefits of the approach of invention embodiments are:

1. A third party can create a simulation model using an encrypted part model without getting know the contents of the part model. Therefore, using this approach, a part model is distributed with confidentiality maintained.
2. An owner of a confidential component may provide a part model to another party even if confidential data is included in the part model.

DETAILED EXAMPLE

For a clear explanation, the following assumptions are made:
One party is called A (the third party)
Another party is called B (the owner)
B has a part model called X.

The encrypted version of the part model X (which B encrypts) is called Z.

A wants to use X in A's simulation model

X includes confidential information. Therefore, the owner B cannot disclose the contents of X.

3-D simulation software which has encrypted and unencrypted functionalities as mentioned in the previous section is called S.

(1). Encryption Phase

Party B (the owner of the component or part model) receives the request to use part model X in a product. However, Party B cannot disclose the design data and simulation data of X. Therefore, Party B encrypts part model X using Software S. When Software S encrypts X to form Z, Software S uses its own internal key (K-I). Party A cannot know the information of Z. Only Software S can understand Z. In order to improve security, Software S can use the RSA methodology, in which, in addition to K-I, B uses A's public key K-PA to encrypt part model X.

Figure 8:
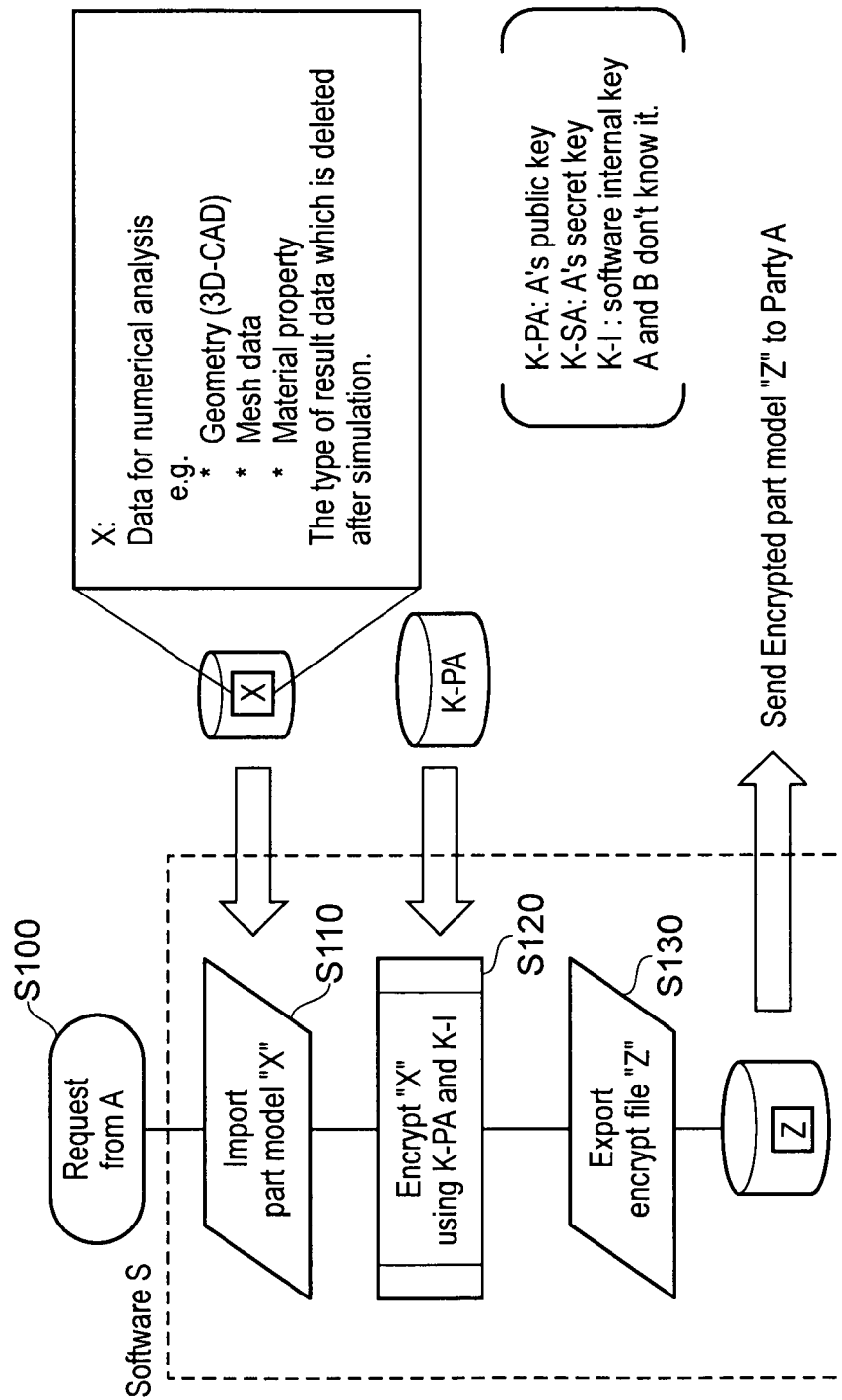
FIG. 8 is the flow of the encryption process inside the owner software.

FIG. 8 shows the process inside party B (the owner) in detail. The request is received from A, the third party modeller, in step S100 and the remaining steps take place within the modelling software S. Firstly, the part model X is imported in step S110. In this embodiment the part model X already includes the restriction of the type of result data which is deleted after simulation as well as geometry, mesh data and material property data. Thus the part model may already include the restriction at the importation stage. In step S120 part model "X" is encrypted using the public key of A as well as the software internal key. Subsequently the encrypted file "Z" is exported to party A in step S130.

Figure 10:
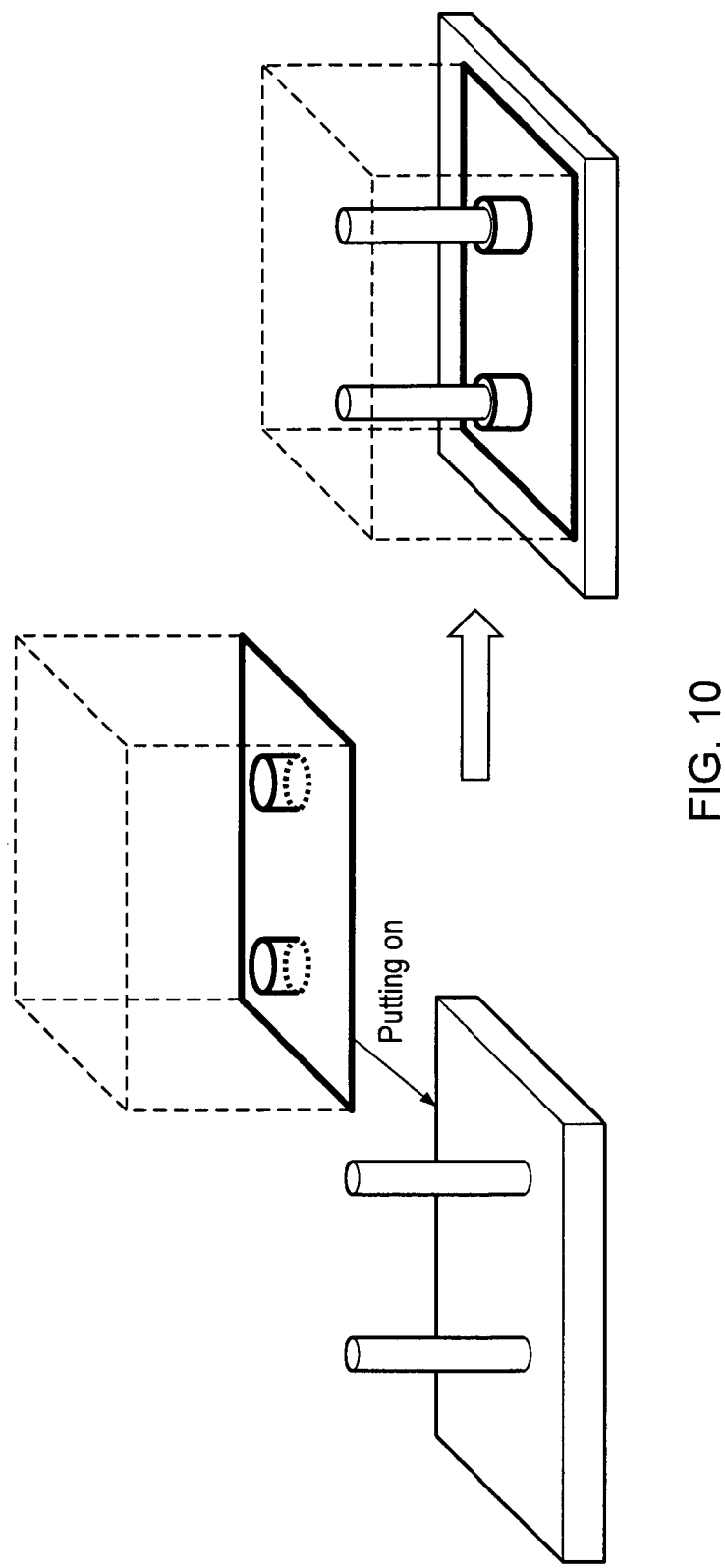
FIG. 10 shows the assembly of an encrypted part model to a part model which is not encrypted.
Figure 11:
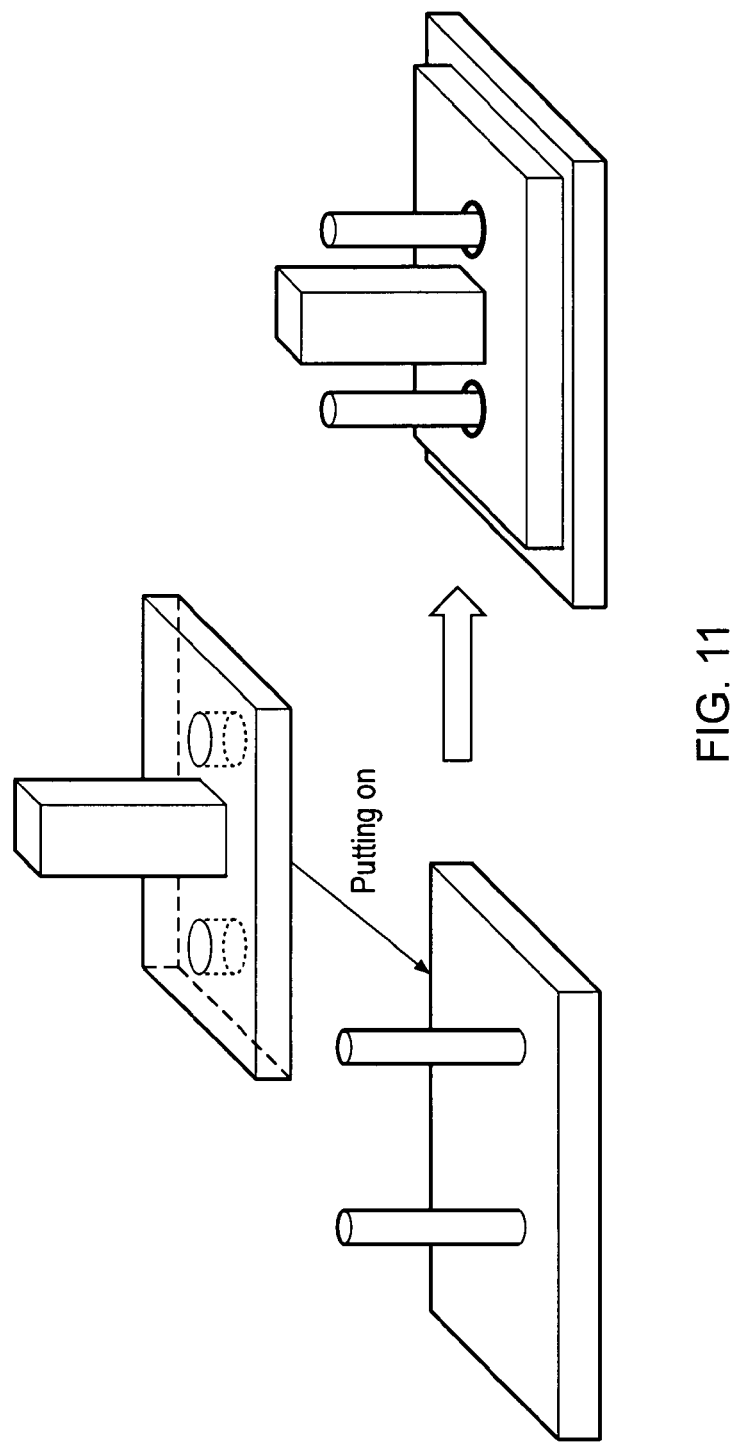
FIG. 11 shows a part model assembly.

When A places encrypted model in its own 3-D simulation model, A needs information about where A should place the component in the 3-D simulation model. Therefore, B can select some geometries to clarify the relation between the component and one or more other parts (e.g. a face which is glued another part, screw holes, pins etc.). Some selected geometries hence remain unencrypted and thus are recognized (visible) in the 3-D simulation software. One example is shown in FIG. 9 which has elements which are not encrypted for clarification of the relation to other parts. In this case, the part has two pin holes and a face which contact another part. A can "see" these geometries. Therefore, A can assemble this encrypted part model to A's own 3-D simulation model as shown in FIG. 10. Actually, two geometries are assembled as shown in FIG. 11, which depicts assembly of the encrypted part model (rendered visible for the purposes of illustration) to a part model which is not encrypted. The user A can only see pin holes and a contact face in the encrypted model. Using this information the user A can assemble the component to another part model.

(2). Decryption Phase

Party A (the third party) receives the encrypted model Z. Party A creates the simulation model by assembling Z. Software S decrypts Z using K-I and K-SA. After the decryption, Software S creates analysis data. Because this process is performed inside Software S, Party A cannot know the content of X. Simulation uses the decrypted part model X and a result is obtained.

Figure 12:
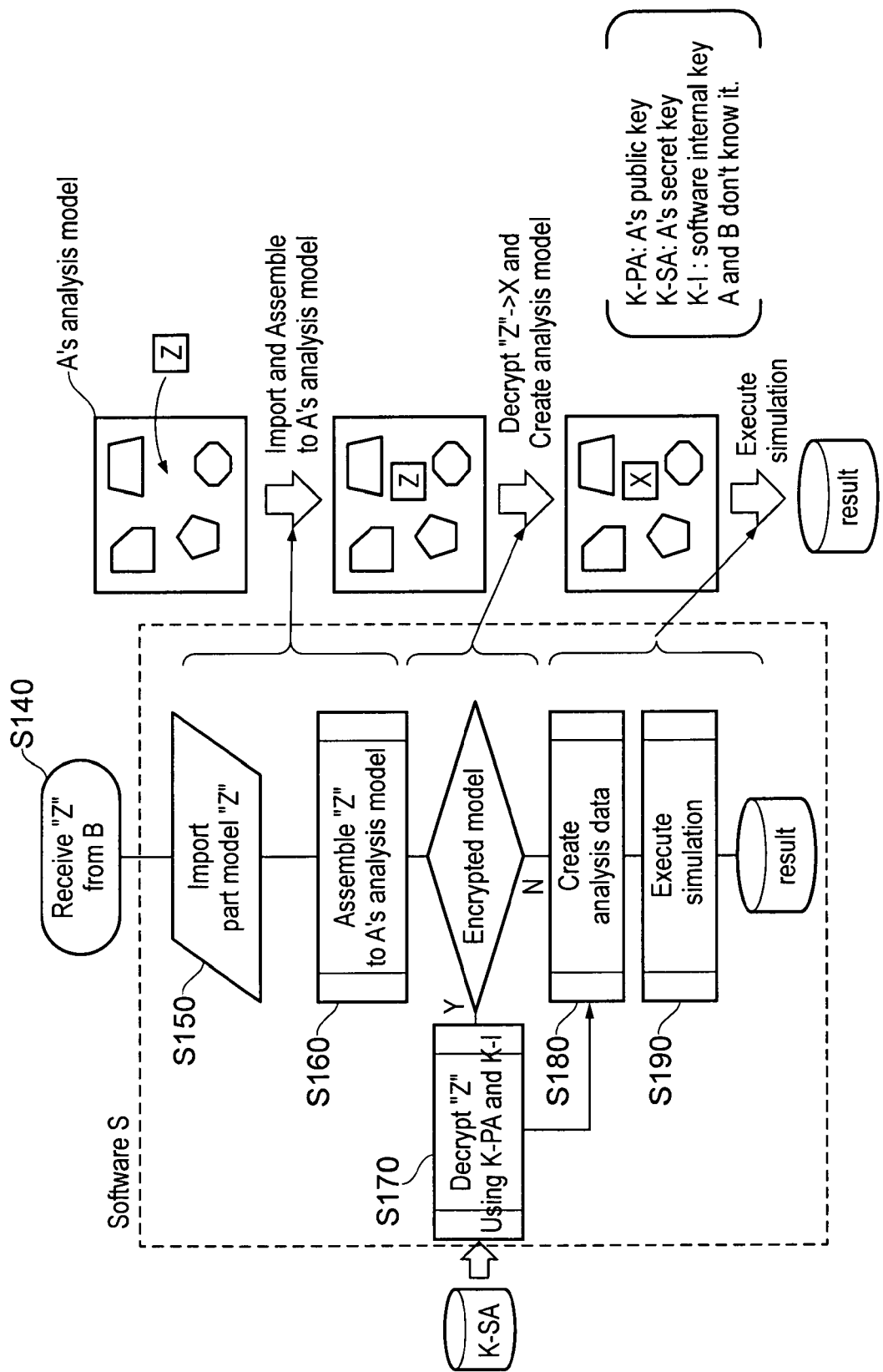
FIG. 12 shows a flow chart to create a simulation model using part encryption according to a general embodiment.

FIG. 12 shows a flow chart to create the simulation model using the encrypted part model.

In step S140 "Z" is received from B. In step S150 the part model "Z" is imported into A's analysis model as shown in the graphic to the right and assembled into the model in step S160. For the encrypted model, Z is decrypted in step S170 using A's secret key to decrypt A's public key with which "Z" was encrypted and further using the software internal key unknown to A and B. Then analysis data is created in step S180 for instance to perform the translation from model data to calculation data (e.g., as a set of simultaneous linear equations). The simulation is executed in step S190.

Party A cannot see all the geometry of Z. Therefore, A cannot confirm whether assembly is correct (with reference to collision with another part, not connection to any other parts, which is achieved using the known interface parts). Thus the 3-D simulation software checks the connection and relation between geometries, even when the part model is encrypted for external purposes as shown in FIG. 8. When an abnormal connection is detected, the software reports the information to the user. For example, the nearest face of a boundary box from the abnormal point is highlighted in a GUI. Also, the area in which encrypted part model can be assembled is shown.

Figure 13:
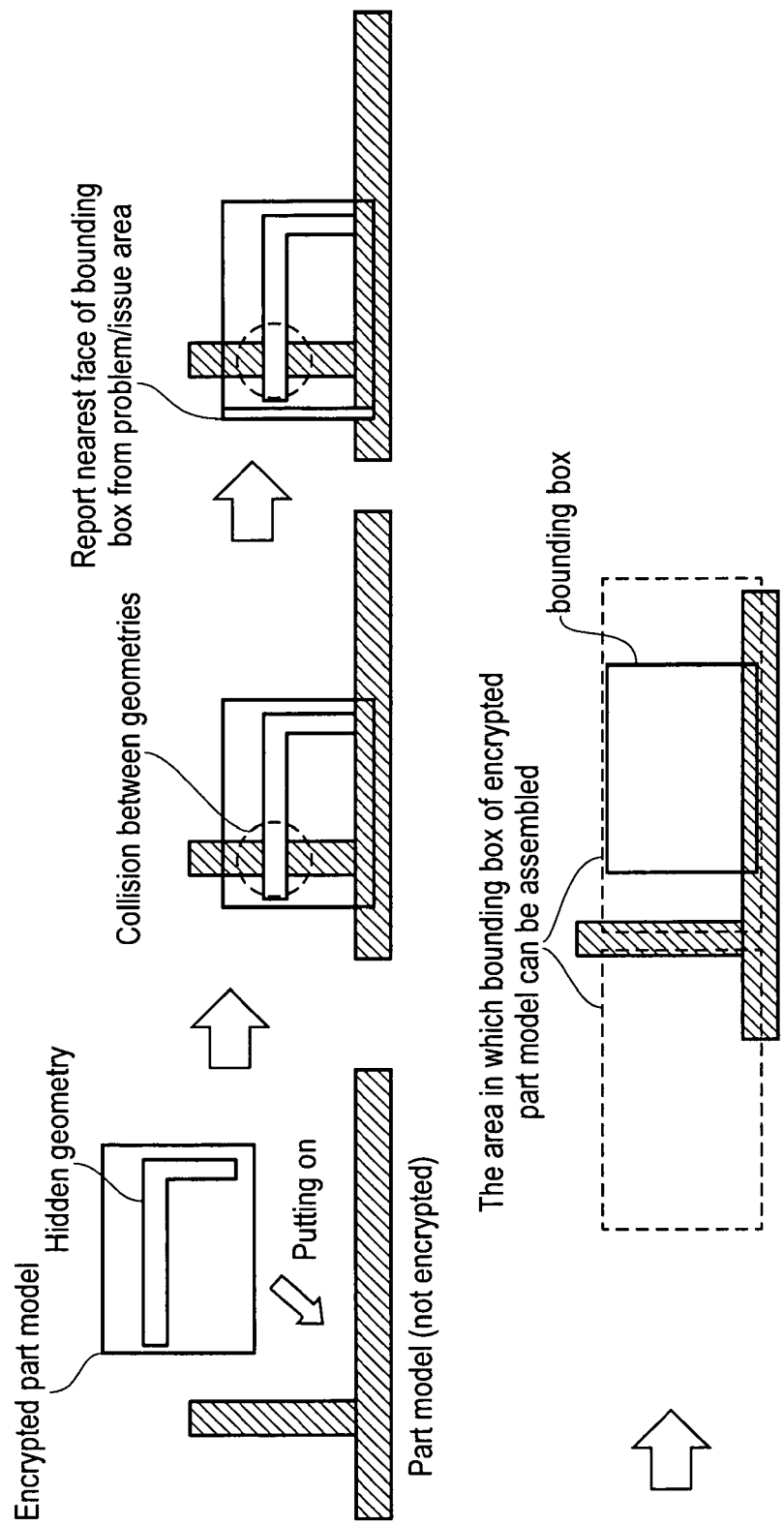
FIG. 13 shows assembly check functionality in the third party modeling software.

FIG. 13 shows various check functionalities used in the software at company A, the third party modeler. When the encrypted part model with its hidden geometry is placed on a non-encrypted model there may be a collision. This may be reported to the user using a bounding/boundary box created after the encrypted part model has been decrypted in the software. For example this box may be created by the maximum extent of the encrypted part model in the three X, Y and Z axis. As an aside, the distinction between this bounding box and the dotted outline shown in FIGS. 9 and 10 is that this dotted outline represents the whole of the component model and thus is likely to include an area around the part which is meshed so that knowledge is included in the shape of the mesh at the boundary between the solid and the fluid.

At the far right of FIG. 13 the GUI is shown highlighting the nearest face of the bounding box to the collision issue. The GUI may additionally or alternatively show the area in which the bounding box can be assembled onto a non-encrypted part model as shown in the lower portion of FIG. 13 and indicated by two dashed rectangles.

(3). Post-Processing Phase

In many cases, party A would be able to guess information about X (e.g. its geometrical shape, or material property) using the result of the simulation (e.g. the temperature profile, flux velocity profile or other characteristics). Therefore, some type of data is restricted, for instance by deletion or encryption. The type of restricted data is described in X and/or Z. Using this information, Software S will delete suitable data.

Figure 14:
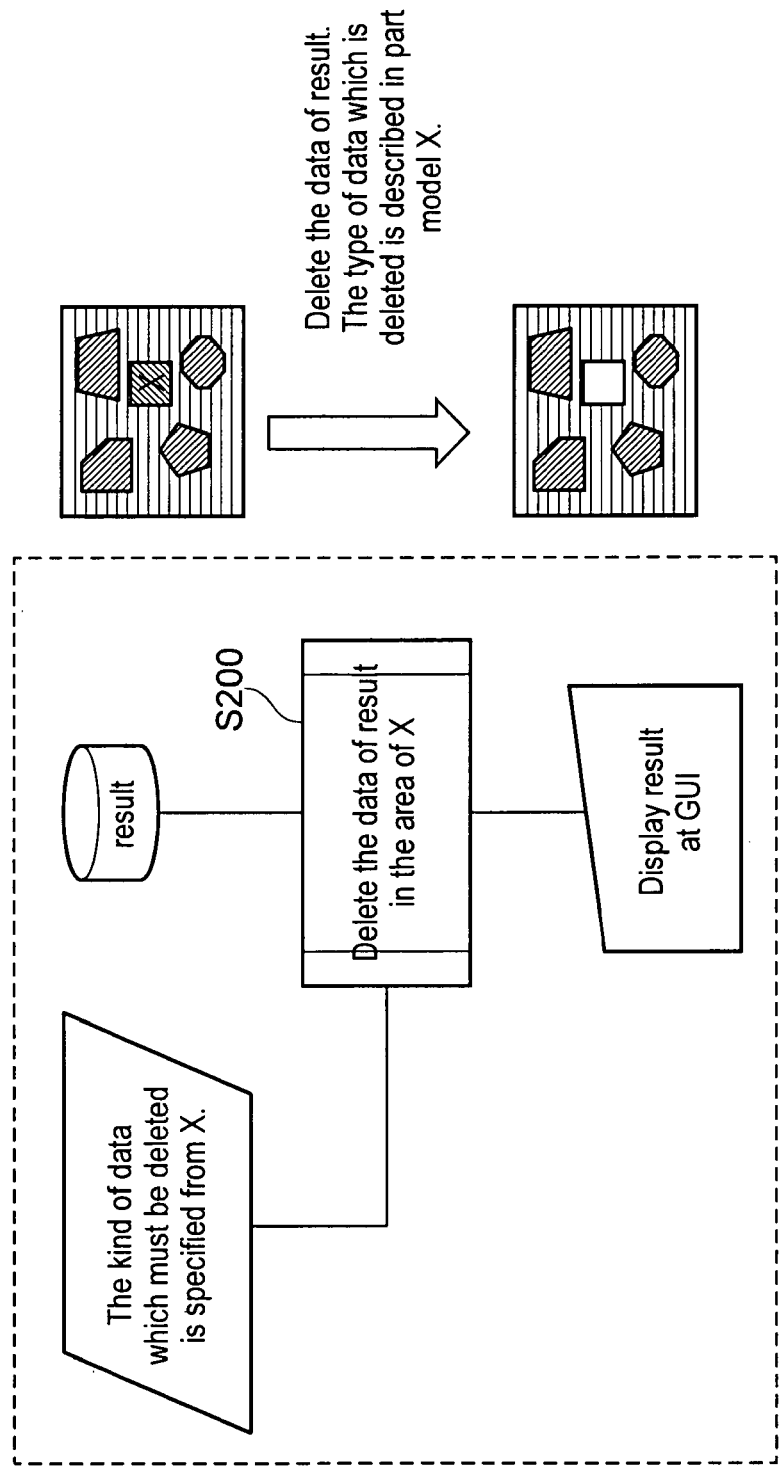
FIG. 14 shows a flow chart of deletion of simulation results.

FIG. 14 shows a flow chart in which the restricted type of data is deleted. In step S200, the result is combined with a specification of data for deletion from X resulting in the deletion as shown in the graphic to the right of the diagram. The result is displayed in a GUI, for example with results omitted at X (as shown in the right-hand graphic), including the mesh extending beyond the actual component structure.

According to invention embodiments, as a first part model is encrypted, it will become impossible to get to know the contents of this part model. However it is possible to carry out simulation. Therefore, even if the part model has confidential information, one party can provide this part model to another party. Moreover another party can create a 3-D simulation model using this part model without getting to know the contents of the part model (or its confidential data).

Examples of Encrypted Components

A Heat Sink

Figure 15:
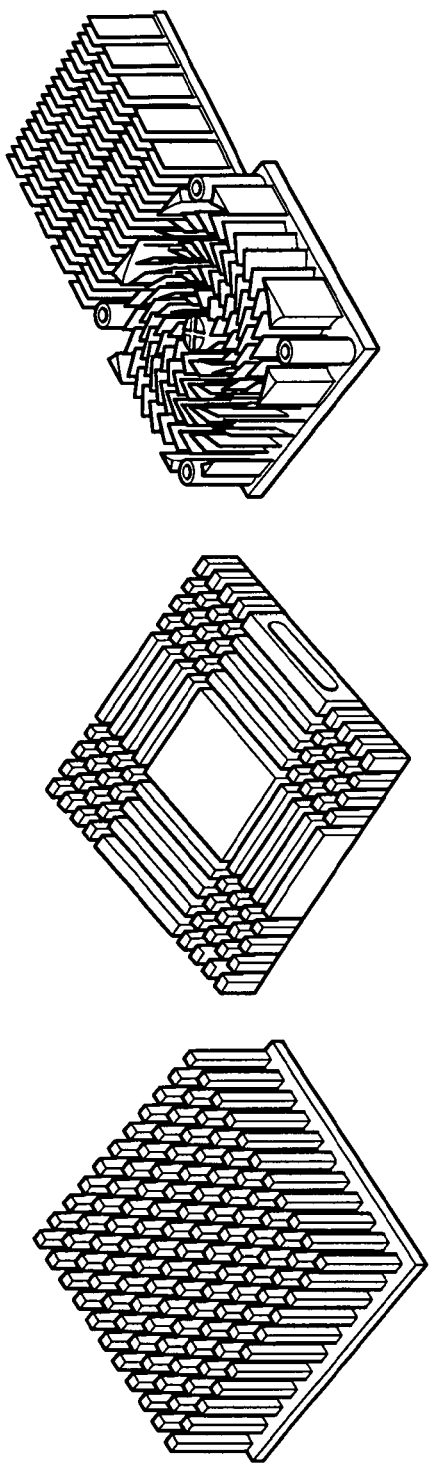
FIG. 15 shows examples of heat sinks.

A heat sink may be used for cooling an LSI circuit. The cooling capability of the heat sink is dependent on its shape and its material. Therefore, the designer of a heat sink does not wish to disclose this information until just before the release of the heat sink itself. Examples of different shapes of heat sinks are shown in FIG. 15.

Figure 16:
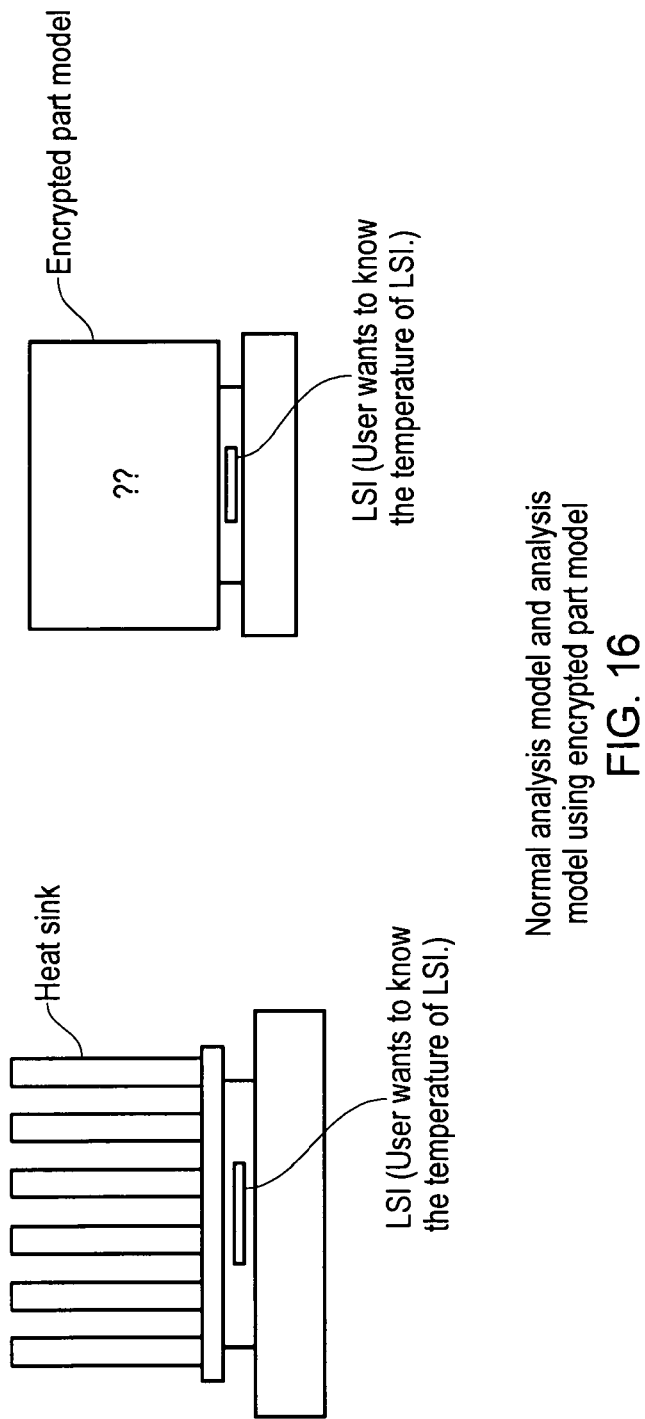
FIG. 16 shows a normal analysis model of heat sinks and an encrypted part model analysis.

Customers for the heat sink will want to evaluate the new component as soon as possible, but the heat sink designer wishes to protect its confidential information. In invention embodiments, the confidential information about the heat sink is encrypted; thus the heat sink designer can provide it to a third party product manufacturer without concern. FIG. 16 shows a normal analysis model in which the heat sink is mounted on the LSI. The customer is interested in the temperature of the LSI. The right hand side of FIG. 16 shows an encrypted part model which still allows the user to find out the temperature of the LSI but does not reveal the shape of the heat sink.

Antenna

Figure 17:
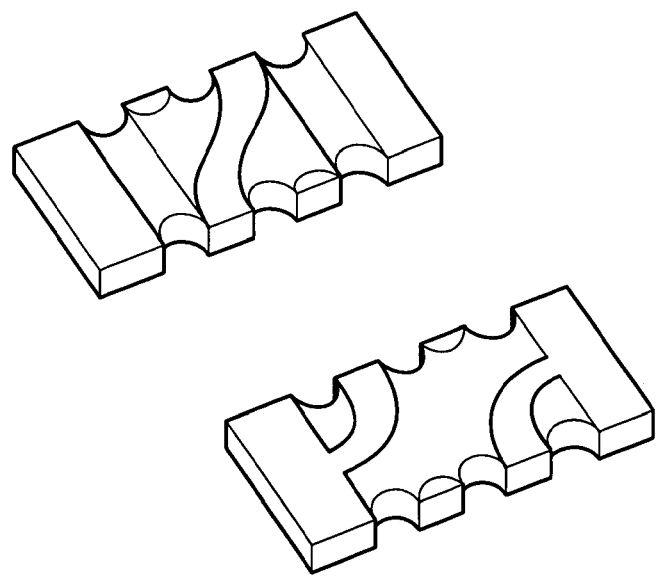
FIG. 17 is a diagram of a chip antenna.

FIG. 17 shows some chip antenna shapes. Just like the heat sink example, the antenna capability is dependent on its shape. However the effect of the antenna within a product such as a mobile phone is dependent on the components and other configuration details surrounding the antenna. Therefore it is important to predict the actual capability of an antenna in situ using three dimensional electromagnetic simulation.

Figure 18:
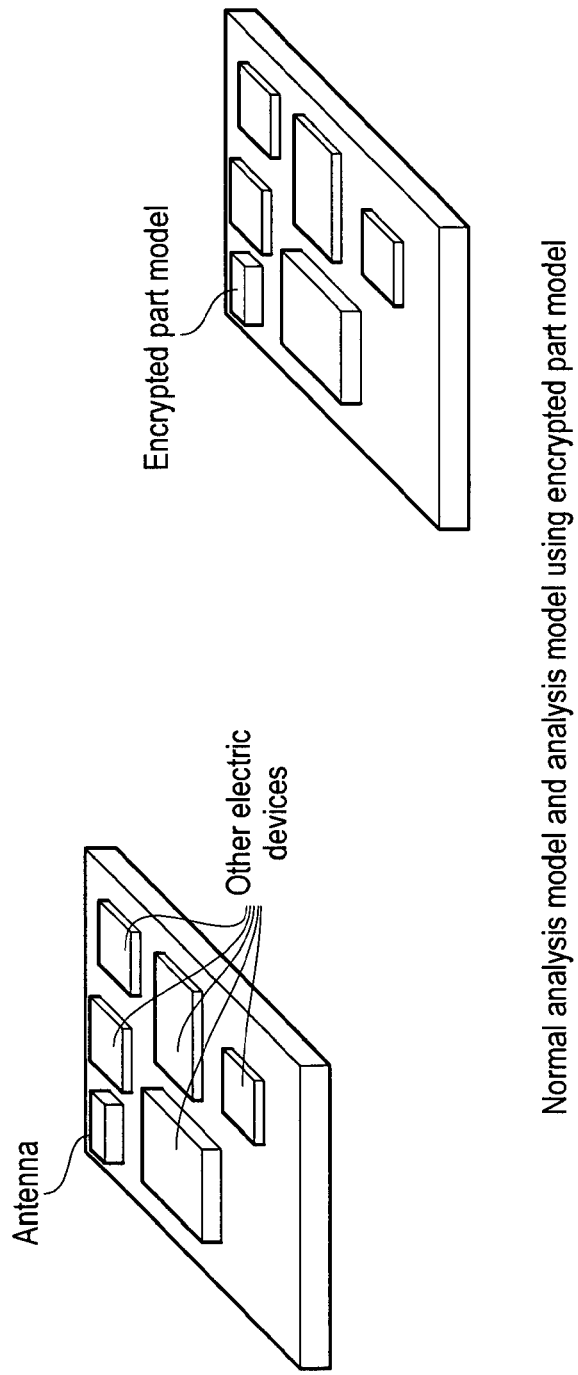
FIG. 18 is a comparison of a normal analysis model and an analysis model using an encrypted part.

FIG. 18 shows a normal analysis model and an analysis model using the encrypted part model. The chip antenna is mounted on a printed circuit board and the customer is interested in the electromagnetic field for example at a distance of three meters from the antenna. This information is obtainable despite the encryption of the part model.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of allowing inclusion of a structural component which is the confidential property of an owner in a third party remote product simulation, the method comprising, in owner modelling software:
    importing a component model including geometry of the component, mesh data and at least one material property of the component;
    encrypting a secure part of the component model which is to remain confidential to the owner using a software key, and leaving an interface part of the component model unencrypted;
    adding a restriction to the component model before the component model is exported, the restriction specifying simulation result data which is not to be visible to the third party; and
    exporting the partially encrypted component model to the third party for use in third party modeling software,
    wherein the interface part of the component model includes geometry data related to the physical relationship of the component model to one or more other components of the product.

2. A method according to claim 1, wherein the product simulation is a physical property-based three-dimensional numerical simulation, such as a computational fluid dynamics, a structural analysis, or a field analysis simulation.

3. A method according to claim 1, wherein the component model includes simulation parameters, such as any of a boundary condition, a time step and a contact condition.

4. A method according to claim 1, wherein the software key is specific to the modelling software and unknown to the third party and unknown to the owner.

5. A method according to claim 1, wherein the secure part is encrypted using both the software key and a user key, wherein the user key is a public key belonging to the third party, for use in decryption with a corresponding private key.

6. A method according to claim 1, wherein the restricted simulation result data which is not to be visible to the third party includes results of the simulation in and/or around the component model, and wherein the default restriction is all the simulation results of the component model.

7. A method of including a structural component which is the confidential property of an owner in a third party product simulation, the method comprising, in the third party modelling software:
    importing a partially encrypted component model including geometry of the component, mesh data, at least one material property of the component, and a restriction specifying simulation result data which is not to be visible to the third party, wherein the partially encrypted component model includes a secure part encrypted using a software key, and an unencrypted interface part;
    inserting the component model within the product model using the unencrypted interface part of the component mode;
    decrypting the secure part of the partially encrypted component model;
    executing the simulation; and
    applying the restriction, and
    wherein the third party modelling software deletes or encrypts restricted simulation result data during or after execution of the simulation, and/or wherein a graphical user interface (GUI) displays the simulation results, except the restricted simulation results.

8. A method according to claim 7, wherein the third party modelling software detects a collision between the component model and one or more other parts of the product model based on the interface part, and highlights the collision to a user via the GUI.

9. A method according to claim 7, wherein the third party modelling software and the GUI creates and displays a bounding box of the component model using the decrypted secure part, and wherein the nearest face of the bounding box to a collision with one or more other parts of the component model is highlighted.

10. A method according to claim 7, wherein the area in which the component model can be included in the product model without collision is shown on the GUI.

11. A non-transitory computer-readable storage medium embodying an owner modelling computer program which when executed on a computing apparatus carries out a method of allowing inclusion of a structural component which is the confidential property of an owner in a third party remote product simulation, the method comprising
    importing a component model including geometry of the component, mesh data and at least one material property of the component;
    encrypting a secure part of the component model which is to remain confidential to the owner using a software key, and leaving an interface part of the component model unencrypted;
    adding a restriction to the component model before the component model is exported, the restriction specifying simulation result data which is not to be visible to the third party; and
    exporting the partially encrypted component model to the third party for use,
    wherein the interface part of the component model includes geometry data related to the physical relationship of the component model to one or more other components of the product.

12. A non-transitory computer-readable storage medium embodying a third party modelling computer program which when executed on a computing apparatus carries out a method of including a structural component which is the confidential property of an owner in a third party product simulation, the method comprising:
- importing a partially encrypted component model including geometry of the component, mesh data, at least one material property of the component, and a restriction specifying simulation result data which is not to be visible to the third party, wherein the partially encrypted component model includes a secure part encrypted using a software key, and an unencrypted interface part;
- inserting the component model within the product model using the unencrypted interface part of the component mode;
- decrypting the secure part of the partially encrypted component model;
- executing the simulation; and
- applying the restriction,
- wherein the third party modelling software deletes or encrypts restricted simulation result data during or after execution of the simulation, and/or wherein a GUI displays the simulation results, except the restricted simulation results.

13. An apparatus arranged to allow inclusion of a structural component which is the confidential property of an owner in a third party remote product simulation, the apparatus comprising:
- a memory to store instructions; and
- a processor to execute the stored instructions, the processor being configured to:
    - import a component model including geometry of the component, mesh data and at least one material property of the component;
    - encrypt a secure part of the component model which is to remain confidential to the owner using a software key, and to leave an interface part of the component model unencrypted;
    - add a restriction to the component model, the restriction specifying simulation result data which is not to be visible to the third party and
    - export the partially encrypted component model to the third party for use in third party modeling software,
- wherein the interface part of the component model includes geometry data related to the physical relationship of the component model to one or more other components of the product.

14. An apparatus arranged to include a structural component which is the confidential property of an owner in a third party product simulation, the apparatus comprising:
- a memory to store instructions; and
- a processor to execute the stored instructions, the processor being configured to:
    - import a partially encrypted component model including geometry of the component, mesh data, at least one material property of the component, and a restriction specifying simulation result data which is not to be visible to the third party, wherein the partially encrypted component model includes a secure part encrypted using a software key, and an unencrypted interface part;
    - insert the component model within the product model using the unencrypted interface part of the component mode;
- decrypting the secure part of the partially encrypted component model;
- executing the simulation; and
- applying the restriction,
wherein the third party modeling software deletes or encrypts restricted simulation result data during or after execution of the simulation, and/or wherein a GUI displays the simulation results, except the restricted simulation results.

\* \* \* \* \*